(12) United States Patent
Kawahara

(10) Patent No.: US 11,015,674 B2
(45) Date of Patent: May 25, 2021

(54) TORQUE FLUCTUATION INHIBITING DEVICE, TORQUE CONVERTER AND POWER TRANSMISSION DEVICE

(71) Applicant: EXEDY Corporation, Neyagawa (JP)

(72) Inventor: Yuki Kawahara, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 74 days.

(21) Appl. No.: 16/471,726

(22) PCT Filed: Nov. 13, 2017

(86) PCT No.: PCT/JP2017/040715
§ 371 (c)(1),
(2) Date: Jun. 20, 2019

(87) PCT Pub. No.: WO2018/150660
PCT Pub. Date: Aug. 23, 2018

(65) Prior Publication Data
US 2019/0331196 A1 Oct. 31, 2019

(30) Foreign Application Priority Data

Feb. 17, 2017 (JP) .............................. JP2017-027687

(51) Int. Cl.
*F16H 45/02* (2006.01)
*F16F 15/14* (2006.01)
*F16F 15/31* (2006.01)

(52) U.S. Cl.
CPC .............. *F16F 15/14* (2013.01); *F16F 15/31* (2013.01); *F16H 45/02* (2013.01); *F16F 2222/08* (2013.01); *F16H 2045/0221* (2013.01)

(58) Field of Classification Search
CPC ........ F16F 15/14; F16F 15/31; F16F 15/1457; F16F 2222/08; F16F 2230/064;
(Continued)

(56) References Cited

U.S. PATENT DOCUMENTS 2,079,226 A 5/1937 Sarazin
5,992,589 A * 11/1999 Fukushima ............. F16H 45/00
192/3.29
(Continued)

FOREIGN PATENT DOCUMENTS

CN 104471279 A 3/2015
CN 204664292 U 9/2015
(Continued)

OTHER PUBLICATIONS

International Search Report dated Jan. 23, 2018 for corresponding International Application No. PCT/JP2017/040715, pp. 2.
(Continued)

*Primary Examiner* — David R Morris
*Assistant Examiner* — Lori Wu
(74) *Attorney, Agent, or Firm* — United IP Counselors, LLC

(57) ABSTRACT

The present device includes a mass body, a centrifugal element and a plurality of conversion mechanisms. The mass body is disposed to be rotatable with the rotor and be rotatable relative to the rotor. The centrifugal element is disposed to receive a centrifugal force to be generated by rotation of at least one of the rotor and the mass body. Each of the plurality of conversion mechanisms is configured to convert the centrifugal force into a circumferential force when a relative displacement is produced between the rotor and the mass body in a rotational direction. The circumferential force is directed to reduce the relative displacement. The respective plurality of conversion mechanisms are disposed at intervals in a circumferential direction.

18 Claims, 17 Drawing Sheets

(58) Field of Classification Search
CPC ............ F16H 45/02; F16H 2045/0221; F16H 2045/0278; F16H 2045/0263
See application file for complete search history.

(56) References Cited

U.S. PATENT DOCUMENTS

| | | | |
|---|---|---|---|
| 6,044,942 A | 4/2000 | Fukushima | |
| 2015/0107950 A1* | 4/2015 | Mauti | F16F 15/12 192/3.28 |
| 2015/0167779 A1 | 6/2015 | Ulbrich et al. | |
| 2015/0276013 A1 | 10/2015 | Kawazoe et al. | |
| 2018/0223948 A1* | 8/2018 | Takikawa | F16F 15/1205 |

FOREIGN PATENT DOCUMENTS

| | | |
|---|---|---|
| CN | 105202144 A | 12/2015 |
| DE | 19841418 A1 | 3/1999 |
| DE | 102015003816 A1 | 10/2015 |
| EP | 3163117 A1 | 5/2017 |
| FR | 2768479 A1 | 3/1999 |
| JP | 11-82628 A | 3/1999 |
| JP | 2014-145413 A | 8/2014 |
| JP | 2015-094424 A | 5/2015 |
| JP | 2015-190523 A | 11/2015 |
| JP | 2016-125511 A | 7/2016 |
| JP | 2017-026139 A | 2/2017 |
| JP | 2017-040318 A | 2/2017 |
| JP | 2017-072167 A | 4/2017 |
| JP | 2017-072190 A | 4/2017 |
| JP | 2017-082819 A | 5/2017 |
| WO | 2016/047789 A1 | 3/2016 |
| WO | 2016/103890 A1 | 6/2016 |
| WO | 2017/014184 A1 | 1/2017 |
| WO | 2017/029931 A1 | 2/2017 |

OTHER PUBLICATIONS

1st Office Action of the corresponding Chinese Application No. 201780086477.8, dated Sep. 2, 2020, 10 pp.
Office Action of the corresponding Japanese Application No. 2017-027687, dated Mar. 31, 2020, 9 pp.

* cited by examiner

TORQUE FLUCTUATION INHIBITING DEVICE, TORQUE CONVERTER AND POWER TRANSMISSION DEVICE

CROSS-REFERENCE TO RELATED APPLICATIONS

This application is the National Phase in the United States of PCT/JP2017/040715, filed Nov. 13, 2017, which claims priority to Japanese Patent Application No. 2017-027687, filed Feb. 17, 2017. Both of those applications are incorporated by reference in their entireties.

TECHNICAL FIELD

The present invention relates to a torque fluctuation inhibiting device, and relates to a torque converter and a power transmission device, each of which includes the torque fluctuation inhibiting device.

BACKGROUND ART

A lock-up device described in Japan Laid-open Patent Application Publication No. 2015-094424 is provided with a dynamic damper device including an inertia member in order to inhibit torque fluctuations. The dynamic damper device described in Japan Laid-open Patent Application Publication No. 2015-094424 is attached to a plate supporting torsion springs, and includes a pair of inertia rings, which is rotatable relative to the plate, and a plurality of coil springs disposed between the plate and the inertia rings.

BRIEF SUMMARY

Torque fluctuations, occurring in a predetermined rotational speed range, can be reduced by providing the lock-up device with the dynamic damper device described in Japan Laid-open Patent Application Publication No. 2015-094424. However, it is preferable to reduce torque fluctuations in as wide a rotational speed range as possible.

It is an object of the present invention to make it possible, in a device for inhibiting torque fluctuations in a rotary member, to reduce torque fluctuations in a relatively wide rotational speed range.

A torque fluctuation inhibiting device according to a first aspect of the present invention is configured to inhibit torque fluctuations in a rotor to which a torque is inputted from a drive source. The torque fluctuation inhibiting device includes a mass body, a centrifugal element and a plurality of conversion mechanisms. The mass body is disposed to be rotatable with the rotor and be rotatable relative to the rotor. The centrifugal element is disposed to receive a centrifugal force to be generated by rotation of at least one of the rotor and the mass body. When a relative displacement is produced between the rotor and the mass body in a rotational direction, the plurality of conversion mechanisms each convert the centrifugal force into a circumferential force directed to reduce the relative displacement. The respective plurality of conversion mechanisms are disposed at intervals in a circumferential direction.

When the torque inputted to the rotor does not fluctuate, any relative displacement is not produced between the rotor and the mass body in the rotational direction. Therefore, the rotor and the mass body are rotated in synchronization with each other. On the other hand, when the torque inputted to the rotor fluctuates, the relative displacement is produced between the mass body and the rotor in the rotational direction (the displacement will be hereinafter expressed as "rotational phase difference" on an as-needed basis) depending on the extent of torque fluctuations, because the mass body is disposed to be rotatable relative to the rotor.

When the rotor and the mass body are herein rotated, a centrifugal force acts on the centrifugal element. Then, when the relative displacement is produced between the rotor and the mass body while the centrifugal force is acting on the centrifugal element, each conversion mechanism is actuated to convert the centrifugal force acting on the centrifugal element into a circumferential force so as to reduce the relative displacement between the rotor and the mass body by the circumferential force. Torque fluctuations are inhibited by the herein described actuation of each conversion mechanism.

Additionally, the centrifugal force acting on the centrifugal elements is used for inhibiting torque fluctuations. Hence, a characteristic of inhibiting torque fluctuations varies in accordance with the rotational speed of the rotor. Because of this, it is possible to reduce torque fluctuations in as wide a rotational speed range as possible.

Preferably, the torque fluctuation inhibiting device includes the plurality of conversion mechanisms that are three or more conversion mechanisms. The respective plurality of conversion mechanisms are disposed at intervals in the circumferential direction. According to this configuration, rotation can be made as stable as possible.

Preferably, the mass body is restricted from moving in a radial direction by either the rotor or a member synchronized with the rotor.

Preferably, the plurality of conversion mechanisms are cam mechanisms.

Preferably, a ratio of an amount of increase in the circumferential force to an amount of the relative displacement between the rotor and the mass body is determined to make a normal mode vibration frequency of the torque fluctuation inhibiting device equal to an excitation vibration frequency of the drive source.

Preferably, a ratio of an amount of increase in the circumferential force to an amount of the relative displacement between the rotor and the mass body is determined to make a normal mode vibration frequency of the torque fluctuation inhibiting device higher than an excitation vibration frequency of the drive source.

Preferably, a ratio of an amount of increase in the circumferential force to an amount of the relative displacement between the rotor and the mass body is determined to make a normal mode vibration frequency of the torque fluctuation inhibiting device lower than an excitation vibration frequency of the drive source.

Preferably, a ratio of a moment of inertia of the mass body to a moment of inertia of the rotor is greater than or equal to 0.033.

A torque fluctuation inhibiting device according to a second aspect of the present invention is configured to inhibit torque fluctuations in a rotor to which a torque is inputted from a drive source. The present torque fluctuation inhibiting device includes a mass body, a centrifugal element and a conversion mechanism. The mass body is disposed to be rotatable with the rotor and be rotatable relative to the rotor. The centrifugal element is disposed to receive a centrifugal force to be generated by rotation of at least one of the rotor and the mass body. When a relative displacement is produced between the rotor and the mass body in a rotational direction, the conversion mechanism converts the centrifugal force into a circumferential force directed to reduce the relative displacement. The mass body is restricted from moving in a radial direction by either the rotor or a member synchronized with the rotor.

A torque fluctuation inhibiting device according to a third aspect of the present invention is configured to inhibit torque fluctuations in a rotor to which a torque is inputted from a drive source. The present torque fluctuation inhibiting device includes a mass body and a conversion mechanism. The mass body is disposed to be rotatable with the rotor and be rotatable relative to the rotor. When a relative displacement is produced between the rotor and the mass body in a rotational direction, the conversion mechanism applies a circumferential force, directed to reduce the relative displacement, to the rotor. A ratio of an amount of increase in the circumferential force to an amount of the relative displacement between the rotor and the mass body increases with increase in a rotational speed of the rotor.

Preferably, the mass body is disposed outside or inside the rotor in a radial direction. In this case, the rotor and the mass body are disposed in radial alignment. Hence, an axial space of the device can be made compact.

Preferably, one of the rotor and the mass body, disposed inside the other of the rotor and the mass body in the radial direction, includes a recess on an outer peripheral surface thereof. Additionally, a centrifugal element is accommodated in the recess so as to be movable in the radial direction. Similarly to the above, the axial space of the device can be made compact in this case too.

Preferably, a friction coefficient between the centrifugal element and the recess of the one of the rotor and the mass body is less than or equal to 0.15.

Preferably, a friction reducing member is disposed between a lateral surface of the centrifugal element, which is disposed along a moving direction of the centrifugal element, and the recess of the one of the rotor and the mass body so as to reduce friction occurring in movement of the centrifugal element.

Preferably, the cam mechanism includes a cam follower, provided on the centrifugal element, and a cam. The cam, with which the cam follower makes contact, is provided on an inner peripheral surface of the other of the rotor and the mass body that is disposed outside the one of the rotor and the mass body in the radial direction, and has a shape making the circumferential force vary in accordance with the amount of the relative displacement between the rotor and the mass body in the rotational direction.

Here, the amount of the relative displacement between the rotor and the mass body in the rotational direction fluctuates in accordance with the magnitude of torque fluctuations in the rotor. At this time, the shape of the cam is set such that the circumferential force, into which the centrifugal force is converted, varies in accordance with the amount of the relative displacement. Hence, torque fluctuations can be inhibited as efficiently as possible.

Preferably, the torque fluctuation inhibiting device further includes an urging member that is disposed inside the recess and urges the centrifugal element outward in the radial direction such that the cam follower makes contact with the cam while the rotor and the mass body are not being rotated.

Here, the urging member causes the centrifugal element to constantly make contact with the cam. Therefore, it is possible to eliminate sound to be produced when the centrifugal element is separated from the cam in stop of rotation or when the centrifugal element makes contact (collides) with the cam in start of rotation.

Preferably, the cam follower is a roller disposed on an outer peripheral surface of the centrifugal element.

Preferably, the cam follower is a protruding portion that is integrated with the centrifugal element and is provided on the outer peripheral surface of the centrifugal element.

Preferably, the cam mechanism includes a cam follower, provided on the inner peripheral surface of the other of the rotor and the mass body that is disposed outside the one of the rotor and the mass body in the radial direction, and a cam. The cam, provided on the centrifugal element, makes contact at an outer peripheral surface thereof with the cam follower, and has a shape making the circumferential force vary in accordance with the amount of the relative displacement between the rotor and the mass body in the rotational direction.

Preferably, the other of the rotor and the mass body, disposed outside the other of the rotor and the mass body in the radial direction, includes a recess on an outer peripheral surface thereof. Additionally, the centrifugal element is accommodated in the recess so as to be movable in the radial direction. Preferably, the cam mechanism includes a cam follower, provided on the centrifugal element, and a cam. The cam, with which the cam follower makes contact, is provided on an inner peripheral surface of the one of the rotor and the mass body that is disposed inside the other of the rotor and the mass body in the radial direction, and has a shape making the circumferential force vary in accordance with the amount of the relative displacement between the rotor and the mass body in the rotational direction.

Preferably, the mass body has a continuous annular shape.

Preferably, the mass body includes a plurality of divided mass bodies disposed in circumferential alignment and a holding member for holding the plurality of divided mass bodies in the radial direction.

A torque converter according to a fourth aspect of the present invention is disposed between an engine and a transmission. The torque converter includes an input-side rotor to which a torque is inputted from the engine, an output-side rotor outputting the torque to the transmission, a damper disposed between the input-side rotor and an output-side rotor, and the torque fluctuation inhibiting device configured as any of the above.

Preferably, the torque fluctuation inhibiting device is disposed on the input-side rotor.

Preferably, the torque fluctuation inhibiting device is disposed on the output-side rotor.

Preferably, the damper includes a first damper to which the torque is inputted from the input-side rotor, a second damper outputting the torque to the output-side rotor, and an intermediate member provided between the first damper and the second damper. Additionally, the torque fluctuation inhibiting device is disposed on the intermediate member.

Preferably, the damper includes a plurality of coil springs. Preferably, the torque converter further includes a float member that is rotatable relative to the input-side rotor and the output-side rotor and supports the plurality of coil springs. The torque fluctuation inhibiting device is disposed on the float member.

A power transmission device according to a fifth aspect of the present invention includes a flywheel, a clutch device and the torque fluctuation inhibiting device configured as any of the above. The flywheel includes a first inertia body rotated about a rotational axis, a second inertia body, which is rotated about the rotational axis and is rotatable relative to the first inertia body, and a damper disposed between the first inertia body and the second inertia body. The clutch device is provided on the second inertia body of the flywheel.

Preferably, the torque fluctuation inhibiting device is disposed on the second inertia body.

Preferably, the torque fluctuation inhibiting device is disposed on the first inertia body.

Preferably, the damper includes a first damper to which a torque is inputted from the first inertia body, a second damper outputting the torque to the second inertia body, and an intermediate member provided between the first damper and the second damper. Additionally, the torque fluctuation inhibiting device is disposed on the intermediate member.

According to the present invention described above, torque fluctuations can be reduced in a relatively wide rotational speed range.

DETAILED DESCRIPTION

Figure 1:
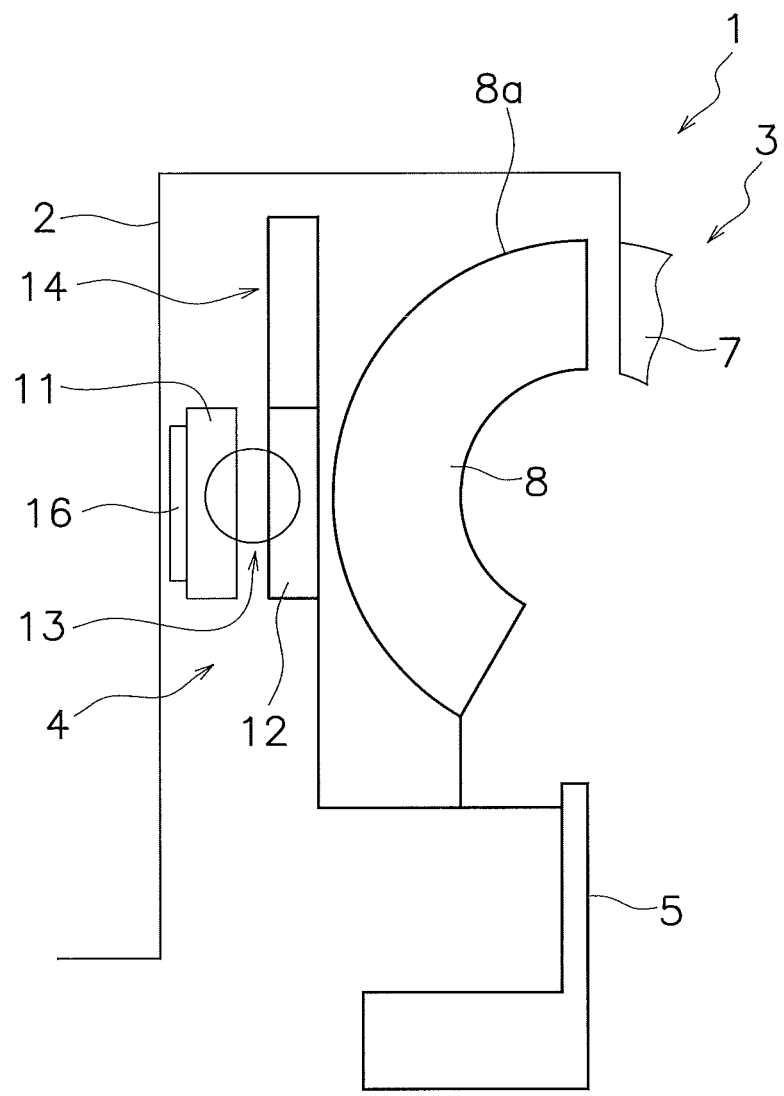
FIG. 1 is a schematic diagram of a torque converter according to an exemplary embodiment of the present invention.

FIG. 1 is a schematic diagram of a condition that a torque fluctuation inhibiting device according to an exemplary embodiment of the present invention is attached to a lock-up device for a torque converter. In FIG. 1, line O-O indicates a rotational axis of the torque converter.

[Entire Configuration]

A torque converter 1 includes a front cover 2, a torque converter body 3, a lock-up device 4 and an output hub 5. A torque is inputted to the front cover 2 from an engine. The torque converter body 3 includes an impeller 7 coupled to the front cover 2, a turbine 8 and a stator (not shown in the drawings). The turbine 8 is coupled to the output hub 5. An input shaft of a transmission (not shown in the drawings) is capable of being spline-coupled to the inner peripheral part of the output hub 5.

[Lock-Up Device 4]

The lock-up device 4 includes a clutch part, a piston to be actuated by hydraulic pressure, and so forth, and is settable to a lock-up on state and a lock-up off state. In the lock-up on state, the torque inputted to the front cover 2 is transmitted to the output hub 5 through the lock-up device 4 without through the torque converter body 3. On the other hand, in the lock-up off state, the torque inputted to the front cover 2 is transmitted to the output hub 5 through the torque converter body 3.

The lock-up device 4 includes an input-side rotor 11, an output-side rotor 12, a damper 13 and a torque fluctuation inhibiting device 14.

The input-side rotor 11 includes an axially movable piston, and is provided with a friction member 16 on the front cover 2-side lateral surface thereof. When the friction member 16 is pressed onto the front cover 2, the torque is transmitted from the front cover 2 to the input-side rotor 11.

The output-side rotor 12 is disposed in axial opposition to the input-side rotor 11, and is rotatable relative to the input-side rotor 11. The output-side rotor 12 is coupled to the output hub 5.

The damper 13 is disposed between the input-side rotor 11 and the output-side rotor 12. The damper 13 includes a plurality of torsion springs, and elastically couples the input-side rotor 11 and the output-side rotor 12 in a rotational direction. The damper 13 transmits the torque from the input-side rotor 11 to the output-side rotor 12, and also, absorbs and attenuates torque fluctuations.

[Torque Fluctuation Inhibiting Device 14]

Figure 2A:
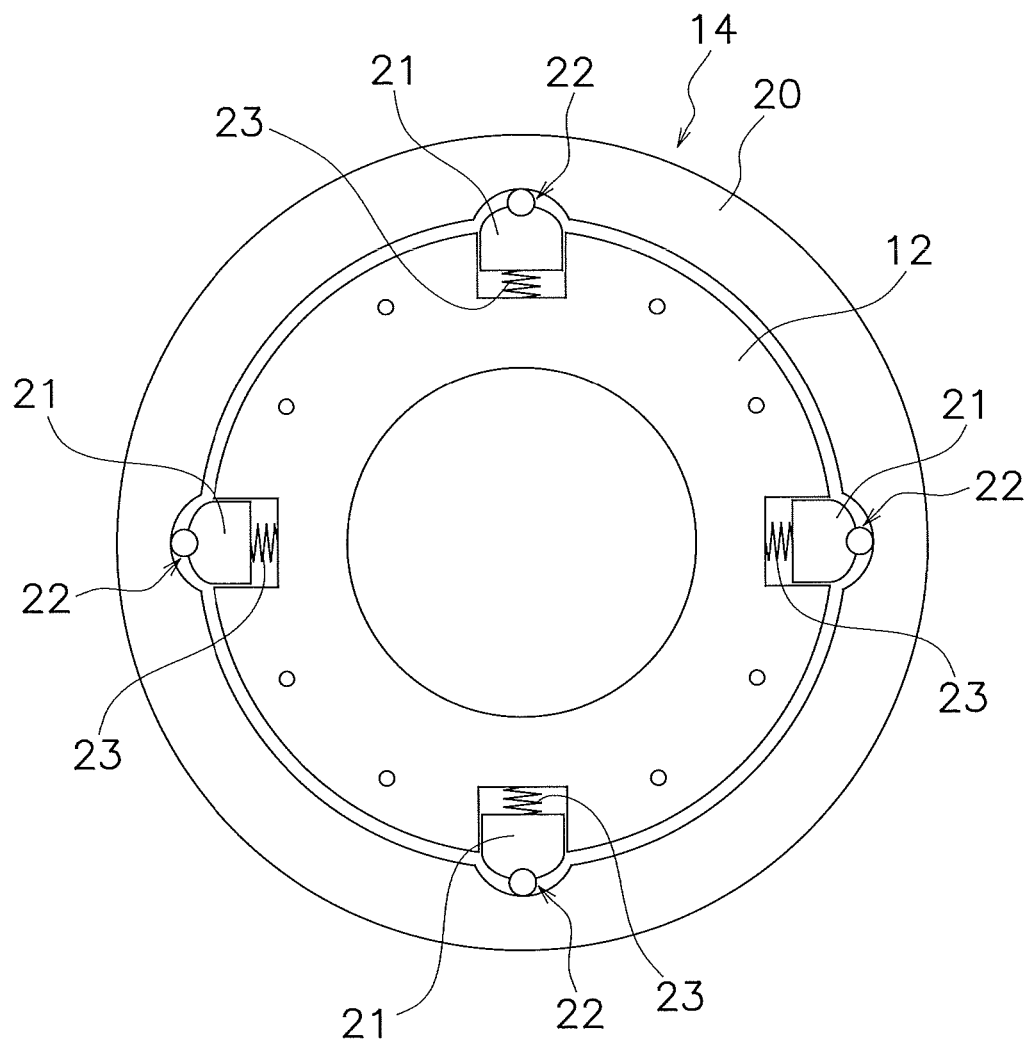
FIG. 2A is a front view of an output-side rotor and a torque fluctuation inhibiting device that are shown in FIG. 1.

FIG. 2A is a front view of the output-side rotor 12 and the torque fluctuation inhibiting device 14. As shown in FIG. 2A, the torque fluctuation inhibiting device 14 includes an inertia ring 20 (exemplary mass body), a plurality of centrifugal elements 21 and a plurality of cam mechanisms 22 (exemplary conversion mechanisms). Additionally, the torque fluctuation inhibiting device 14 may further include a plurality of coil springs 23.

Figure 2B:
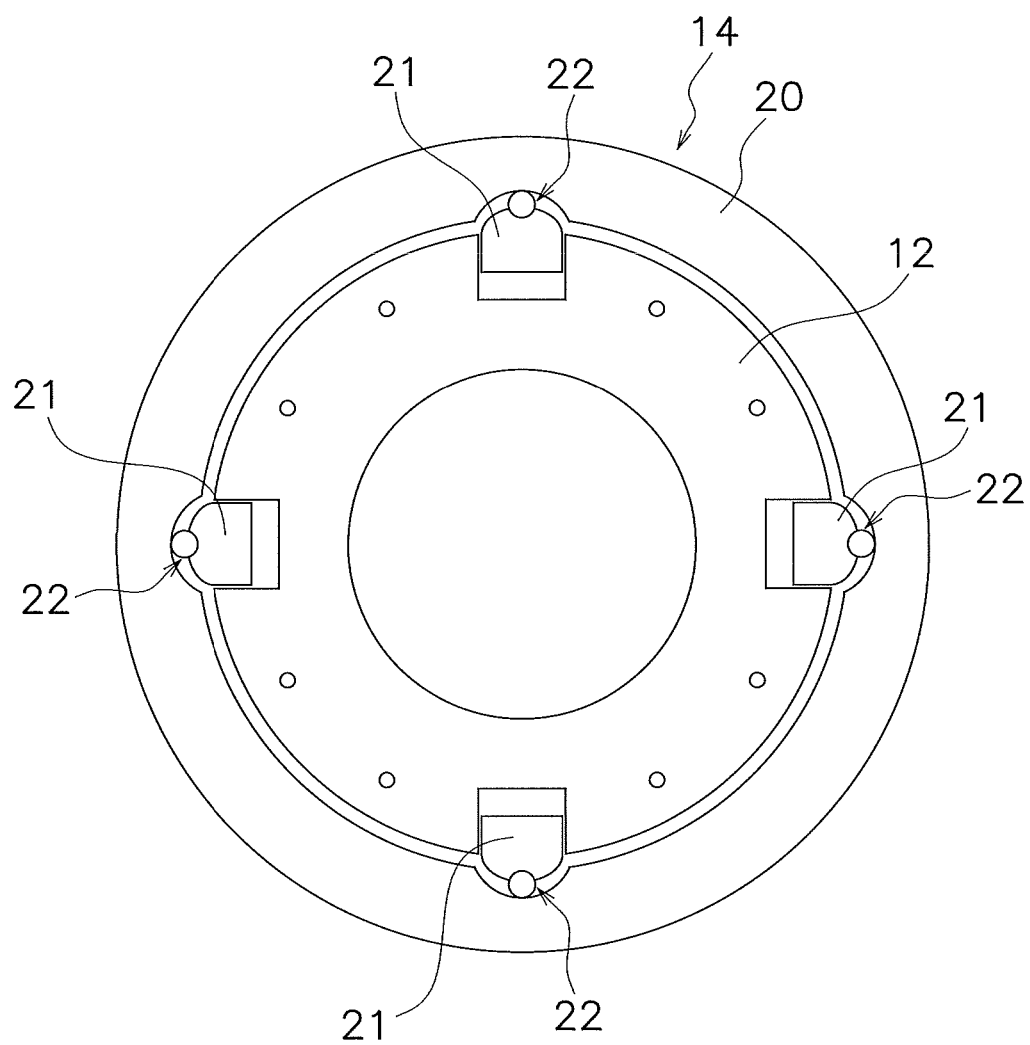
FIG. 2B is a diagram according to another exemplary embodiment and corresponds to FIG. 2A.

It should be noted that alternatively, the coil springs 23, disposed radially inside the centrifugal elements 21, respectively, can be omitted as shown in FIG. 2B. Likewise, the coil springs 23 may be provided or omitted in respective examples to be hereinafter explained.

As shown in FIG. 2A, the inertia ring 20 is a continuous annular plate having a predetermined thickness. The inertia ring 20 is disposed radially outside the output-side rotor 12, while a gap is produced therebetween. The inner peripheral surface of the inertia ring 20 and the outer peripheral surface of the output-side rotor 12 are radially opposed to each other. In other words, the inertia ring 20 is disposed axially in the same position as the output-side rotor 12. Because of this, when rotation of the torque fluctuation inhibiting device 14 is made at a low speed or is stopped, the inertia ring 20 is restricted from radially moving by the output-side rotor 12. In other words, the inner peripheral surface of the inertia ring 20 makes contact with the outer peripheral surface of the output-side rotor 12, whereby the inertia ring 20 is restricted from radially moving.

The inertia ring 20 has a rotational axis, which is the same as that of the output-side rotor 12. The inertia ring 20 is rotatable with the output-side rotor 12, and is also rotatable relative thereto. A ratio of a moment of inertia of the inertia ring 20 to that of the output-side rotor 12 is preferably set to be greater than or equal to 0.033.

The respective centrifugal elements 21 are disposed at intervals in a circumferential direction. Preferably, the respective centrifugal elements 21 are disposed at equal intervals in the circumferential direction. The number of the centrifugal elements 21 is not limited to a specific value, but is preferably set to be greater than or equal to three. With this configuration, rotation of the inertia ring 20 can be made as stable as possible. The centrifugal elements 21 are disposed to receive centrifugal forces to be generated by rotation of the output-side rotor 12. The centrifugal elements 21 are disposed in the output-side rotor 12, and are movable radially outward by the centrifugal forces to be generated by rotation of the output-side rotor 12.

Figure 3:
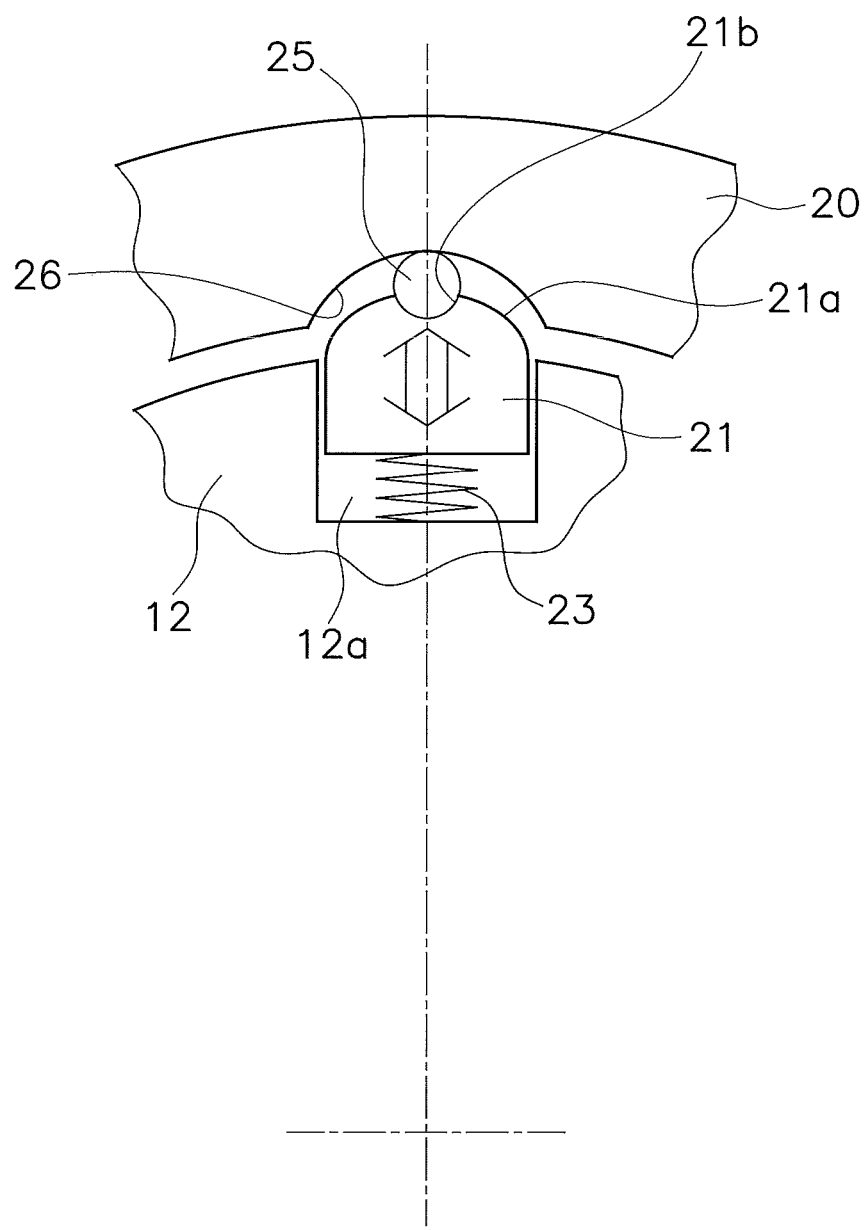
FIG. 3 is a partial enlarged view of FIG. 2A.

In more detail, as shown close-up in FIG. 3, the output-side rotor 12 includes recesses 12a on the outer peripheral surface thereof. Each recess 12a is provided on the outer peripheral surface of the output-side rotor 12 so as to be recessed toward the rotational center disposed radially inside. Additionally, the centrifugal elements 21 are inserted into the recesses 12a, respectively, and are radially movable therein. The centrifugal elements 21 and the recesses 12a are constructed such that a friction coefficient between the lateral surfaces of each centrifugal element 21 and each recess 12a is set to be less than or equal to 0.1. Moreover, each centrifugal element 21 is made in the shape of a plate having approximately the same thickness as the output-side rotor 12. An outer peripheral surface 21a of each centrifugal element 21 has a circular-arc shape. Furthermore, each centrifugal element 21 is provided with a roller accommodation portion 21b recessed inside from the outer peripheral surface 21a.

As shown in FIG. 2A, the respective cam mechanisms 22 are disposed at intervals in the circumferential direction. Preferably, the respective cam mechanisms 22 are disposed at equal intervals in the circumferential direction. The number of the cam mechanisms 22 is not limited to a specific value, but is preferably set to be greater than or equal to three. With this configuration, rotation of the inertia ring 20 can be made as stable as possible. When relative displacement (rotational phase difference) is produced between the output-side rotor 12 and the inertia ring 20 in the rotational direction, each cam mechanism 22 is configured to convert a centrifugal force, generated in each centrifugal element 21, into a circumferential force directed to reduce the relative displacement.

As shown in FIG. 3, each cam mechanism 22 includes a roller 25 as a cam follower and a cam 26 provided on the inner peripheral surface of the inertia ring 20. The roller 25 is attached to the roller accommodation portion 21b of each centrifugal element 21, and is radially movable together with each centrifugal element 21. It should be noted that the roller 25 may be rotatable in or fixed to the roller accommodation portion 21b. The cam 26 is a circular-arc surface with which the roller 25 makes contact. The roller 25 is moved along the cam 26 when the output-side rotor 12 and the inertia ring 20 are rotated relative to each other in a predetermined angular range.

Although described below in detail, when rotational phase difference is produced between the output-side rotor 12 and the inertia ring 20 by the contact between each roller 25 and each cam 26, a centrifugal force generated in each centrifugal element 21 and each roller 25 is converted into a circumferential force by which the rotational phase difference is reduced.

Each coil spring 23 is disposed between the bottom surface of each recess 12a and the radially inner surface of each centrifugal element 21, and urges each centrifugal element 21 radially outward. Each centrifugal element 21 and each roller 25 are pressed onto each cam 26 of the inertia ring 20 by the urging force of each coil spring 23. Therefore, each roller 25 makes contact with each cam 26 even when a centrifugal force does not act on each centrifugal element 21 in a condition that the output-side rotor 12 is not being rotated.

[Actuation of Cam Mechanisms 22]

Actuation of each cam mechanism 22 (inhibition of torque fluctuations) will be explained with FIGS. 3 and 4. In the lock-up on state, a torque transmitted to the front cover 2 is transmitted to the output-side rotor 12 through the input-side rotor 11 and the damper 13.

When torque fluctuations do not exist in torque transmission, the output-side rotor 12 and the inertia ring 20 are rotated in the condition shown in FIG. 3. In other words, the roller 25 in each cam mechanism 22 is contacted to the deepest position (the circumferential middle position) of the cam 26, and the rotational phase difference between the output-side rotor 12 and the inertia ring 20 is "0".

As described above, the rotation-directional relative displacement between the output-side rotor 12 and the inertia ring 20 is referred to as "rotational phase difference". In FIGS. 3 and 4, these terms indicate displacement between the circumferential middle position of each centrifugal element 21 and each roller 25 and that of each cam 26.

Figure 4:
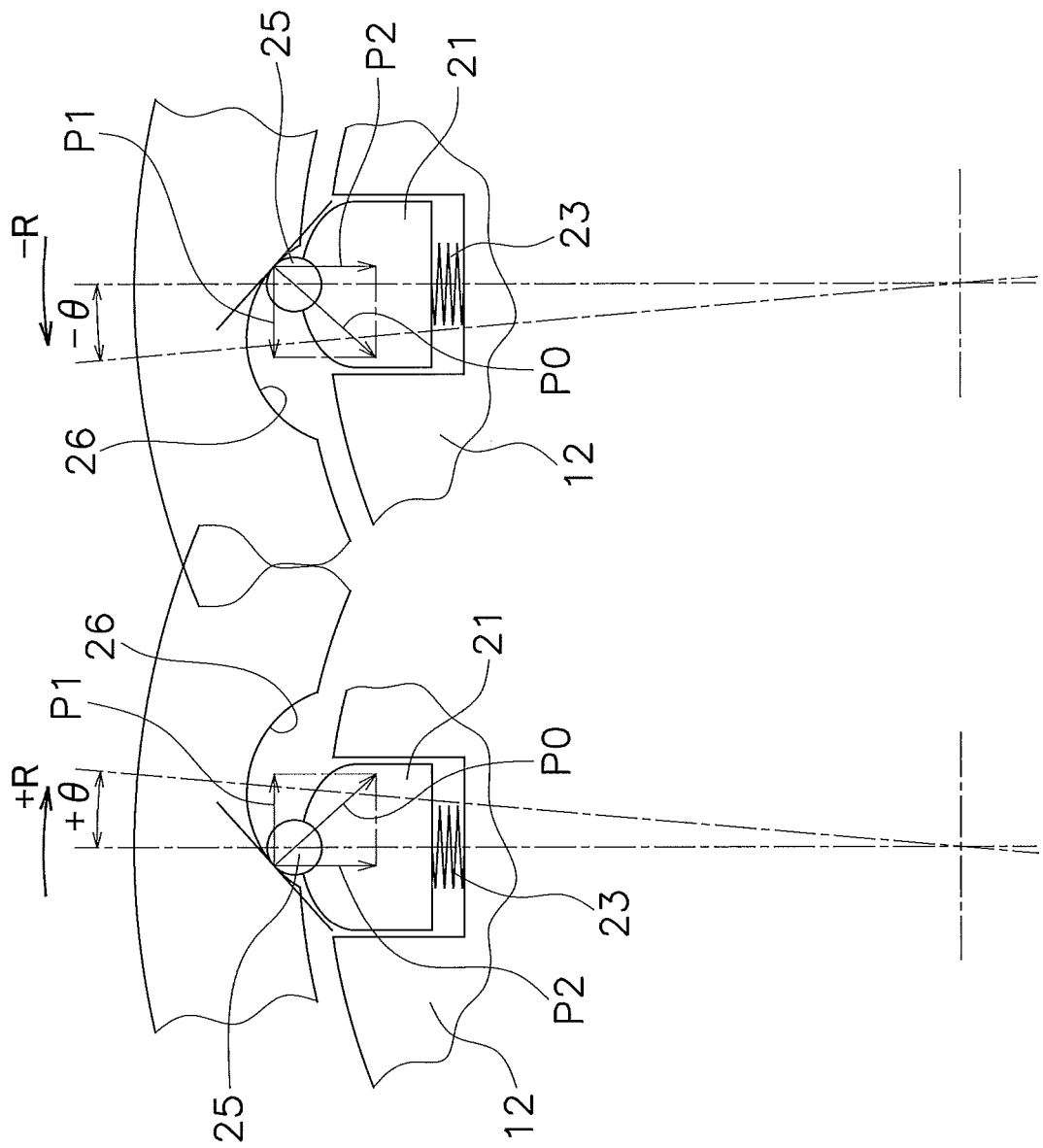
FIG. 4 is a diagram for explaining actuation of a cam mechanism.

On the other hand, when torque fluctuations exist in torque transmission, rotational phase difference ±θ is produced between the output-side rotor 12 and the inertia ring 20 as shown in FIG. 4. The left side of FIG. 4 shows a condition that the rotational phase difference +θ is produced to a +R side, whereas the right side of FIG. 4 shows a condition that the rotational phase difference −θ is produced to a −R side.

As shown in the left side of FIG. 4, when the rotational phase difference +θ is produced between the output-side rotor 12 and the inertia ring 20, the roller 25 in each cam mechanism 22 is relatively moved along each cam 26 leftward in the left side of FIG. 4. At this time, a centrifugal force acts on each centrifugal element 21 and the roller 25. Hence, a reaction force to be received by the roller 25 from each cam 26 has a direction and a magnitude indicated by P0 in the left side of FIG. 4. A first force component P1 and a second force component P2 are produced by the reaction force P0. The first force component P1 is directed in the circumferential direction, whereas the second force component P2 is directed to move each centrifugal element 21 and the roller 25 toward the rotational center.

Additionally, the first force component P1 acts as a force to move the output-side rotor 12 rightward in the left side of FIG. 4 through each cam mechanism 22. In other words, a circumferential force directed to reduce the rotational phase difference between the output-side rotor 12 and the inertia ring 20 is supposed to act on the output-side rotor 12. On the other hand, the second force component P2 moves each centrifugal element 21 and the roller 25 radially inward against the urging force of each coil spring 23.

The right side of FIG. 4 shows a condition that the rotational phase difference −θ is produced between the output-side rotor 12 and the inertia ring 20. The right side of FIG. 4 is similar to the left side of FIG. 4 regarding the actuation of each cam mechanism 22, although the right side of FIG. 4 is different from the left side of FIG. 4 only regarding the moving direction of the roller 25 in each cam mechanism 22 and the directions of the reaction force P0, the first force component P1 and the second force component P2.

As described above, when rotational phase difference is produced between the output-side rotor 12 and the inertia ring 20 by torque fluctuations, the output-side rotor 12 receives a force (first force component P1) directed to reduce the rotational phase difference between the both by the centrifugal force acting on each centrifugal element 21 and the working of each cam mechanism 22. Torque fluctuations are inhibited by this force.

The aforementioned force to inhibit torque fluctuations varies in accordance with the centrifugal force, in other words, the rotational speed of the output-side rotor 12, and also varies in accordance with the rotational phase difference and the shape of each cam 26. Therefore, by suitably setting the shape of each cam 26, characteristics of the torque fluctuation inhibiting device 14 can be made optimal in accordance with the specification of the engine and so forth.

For example, each cam 26 can be made in a shape that makes the first force component P1 linearly vary in accordance with the rotational phase difference in a condition where the centrifugal force acting is constant. Alternatively, each cam 26 can be made in a shape that makes the first force component P1 non-linearly vary in accordance with the rotational phase difference.

Specifically, a ratio K in amount of increase in circumferential force to relative displacement between the output-side rotor 12 and the inertia ring 20 can be determined to make a normal mode vibration frequency $f_t$ of the torque fluctuation inhibiting device 14 equal to an excitation vibration frequency $f_e$ of the engine. It should be noted that the excitation vibration frequency $f_e$ (Hz) of the engine can be calculated with the following equation (1) based on an excitation order $q_e$ of the engine (e.g., $q_e=1$, where the engine is of a two cylinder type; $q_e=2$, where the engine is of a four cylinder type) and rotational speed n (rpm) of the engine.

[Math. 1]

$$f_e = q_e \frac{n}{60} \quad (1)$$

Additionally, the normal mode vibration frequency $f_t$ (Hz) of the torque fluctuation inhibiting device 14 can be calculated with the following equation (2).

[Math. 2]

$$f_t = \frac{1}{2\pi}\sqrt{\frac{K}{I}} \quad (2)$$

It should be noted that I is a moment of inertia.

With the aforementioned equations (1) and (2), the ratio K in amount of increase in circumferential force to relative displacement between the output-side rotor 12 and the inertia ring 20 can be determined.

It should be noted that the ratio K in amount of increase in circumferential force to relative displacement between the output-side rotor 12 and the inertia ring 20 may be determined to make the normal mode vibration frequency $f_t$ of the torque fluctuation inhibiting device 14 higher than the excitation vibration frequency $f_e$ of the engine. In this case, for instance, it is only required to add a predetermined offset value (of e.g., about 0.02) to the excitation order $q_e$ of the engine in the aforementioned equation (1).

Alternatively, the ratio K in amount of increase in circumferential force to relative displacement between the output rotor 12 and the inertia ring 20 may be determined to make the normal mode vibration frequency $f_t$ of the torque fluctuation inhibiting device 14 lower than the excitation vibration frequency $f_e$ of the engine. In this case, for instance, it is only required to subtract a predetermined offset value (of e.g., about 0.02) from the excitation order $q_e$ of the engine in the aforementioned equation (1).

[Exemplary Characteristics]

Figure 5:
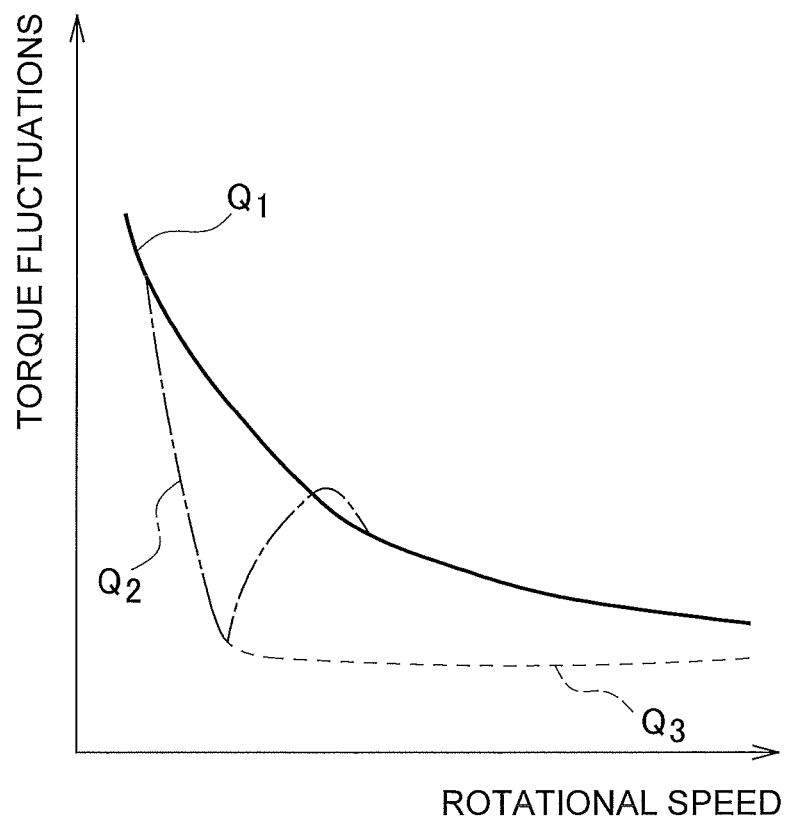
FIG. 5 is a characteristic diagram showing a relation between rotational speed and torque fluctuations.

FIG. 5 is a chart showing exemplary torque fluctuation inhibiting characteristics. The horizontal axis indicates rotational speed, whereas the vertical axis indicates torque fluctuations (rotation velocity fluctuations). Characteristic Q1 indicates a condition without installation of a device for inhibiting torque fluctuations; characteristic Q2 indicates a condition with installation of a well-known dynamic damper device; and characteristic Q3 indicates a condition with installation of the torque fluctuation inhibiting device 14 of the present exemplary embodiment.

As is obvious from FIG. 5, in an apparatus in which the well-known dynamic damper device is installed (characteristic Q2), torque fluctuations can be inhibited only in a specific rotational speed range. By contrast, in the present exemplary embodiment (characteristic Q3), torque fluctuations can be inhibited in a wider rotational speed range.

[Modifications of Cam Mechanisms 22]

Modification 1

Figure 6:
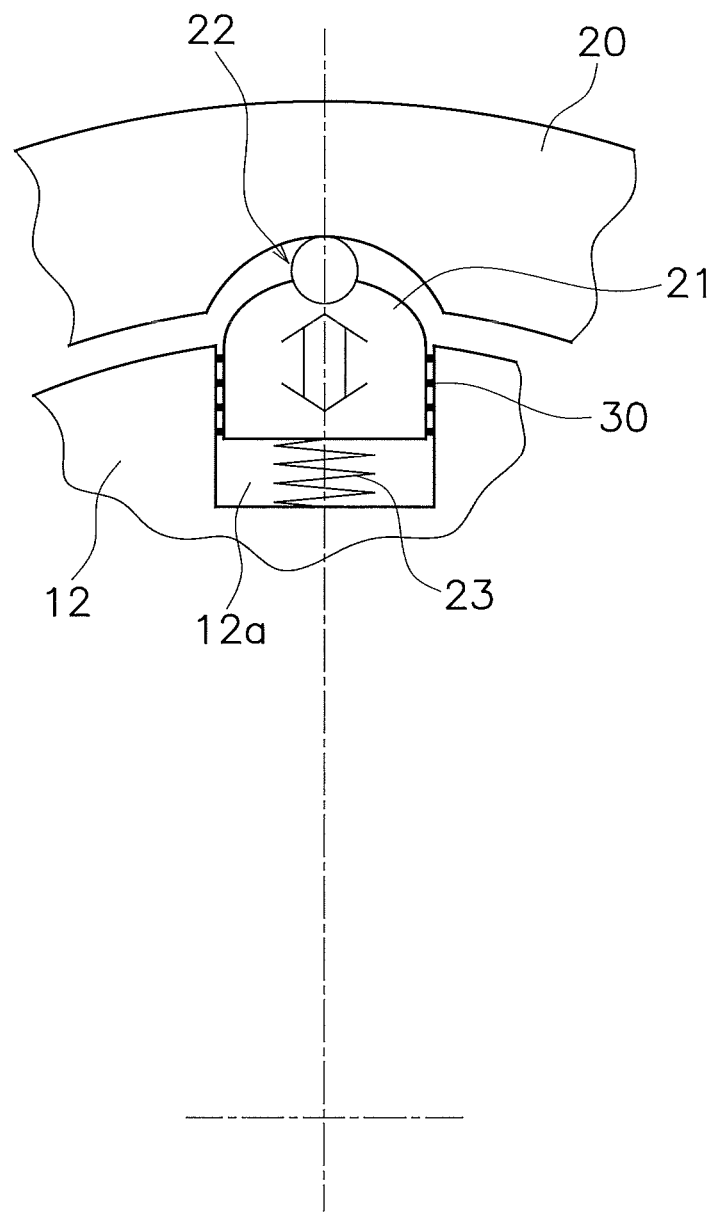
FIG. 6 is a diagram of a cam mechanism according to modification 1 and corresponds to FIG. 3.

In an exemplary embodiment shown in FIG. 6, at least one friction reducing member 30, taking the form of a bearing, a roller, a resin race, a sheet or so forth, is disposed between each centrifugal element 21 and the lateral surfaces (circumferential end surfaces) of each recess 12a. When moved, each centrifugal element 21 can be moved as smoothly as possible by disposing the at least one friction reducing member 30 configured as described above.

Modification 2

Figure 7:
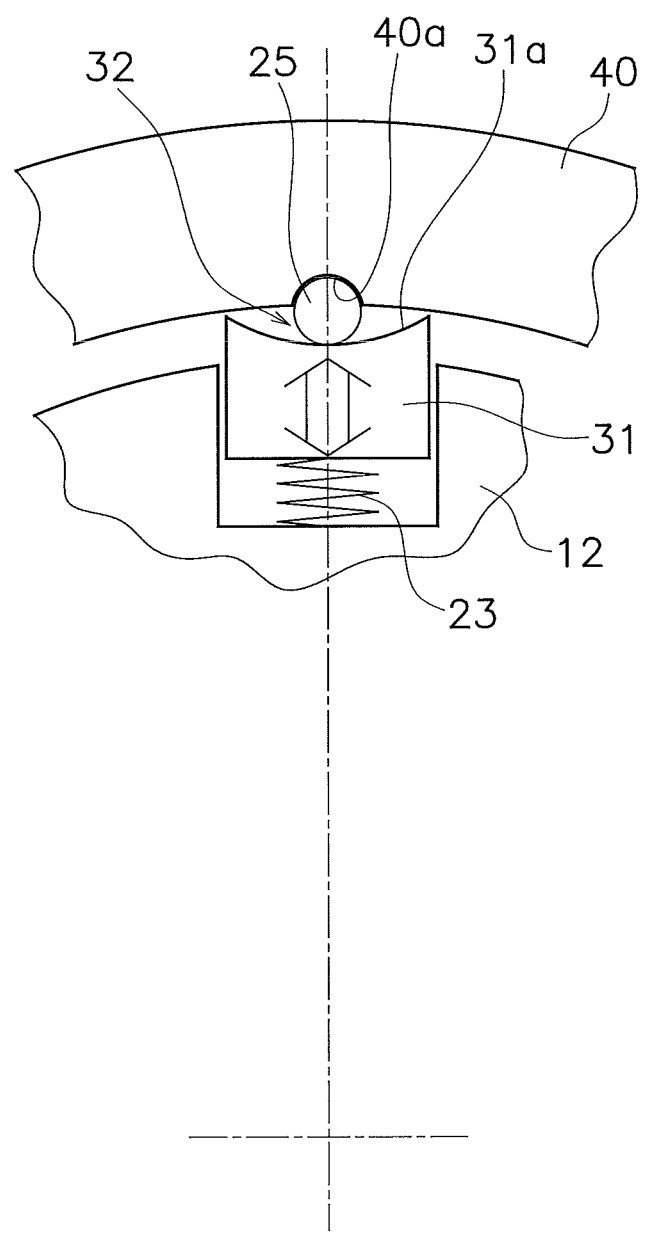
FIG. 7 is a diagram of a cam mechanism according to modification 2 and corresponds to FIG. 3.

In an exemplary embodiment shown in FIG. 7, the shape of each centrifugal element and that of the inertia ring are different from those in the aforementioned exemplary embodiment. In other words, an outer peripheral surface 31a of each centrifugal element 31 is made in the shape of a circular arc recessed radially inward. This outer peripheral surface 31a functions as a cam. On the other hand, an inertia ring 40 includes roller accommodation portions 40a on the inner peripheral surface thereof. Each roller accommodation portion 40a accommodates each roller 25 functioning as a cam follower. Additionally, each roller 25 makes contact with each outer peripheral surface 31a functioning as a cam.

This exemplary embodiment is different from the aforementioned exemplary embodiment regarding that the roller 25, functioning as a cam follower in each cam mechanism 32, is disposed on the inertia ring 40 whereas the cam 31a is provided on each centrifugal element 31. However, this exemplary embodiment is similar to the aforementioned exemplary embodiment regarding the other constituent elements and actuation.

Modification 3

Figure 8:
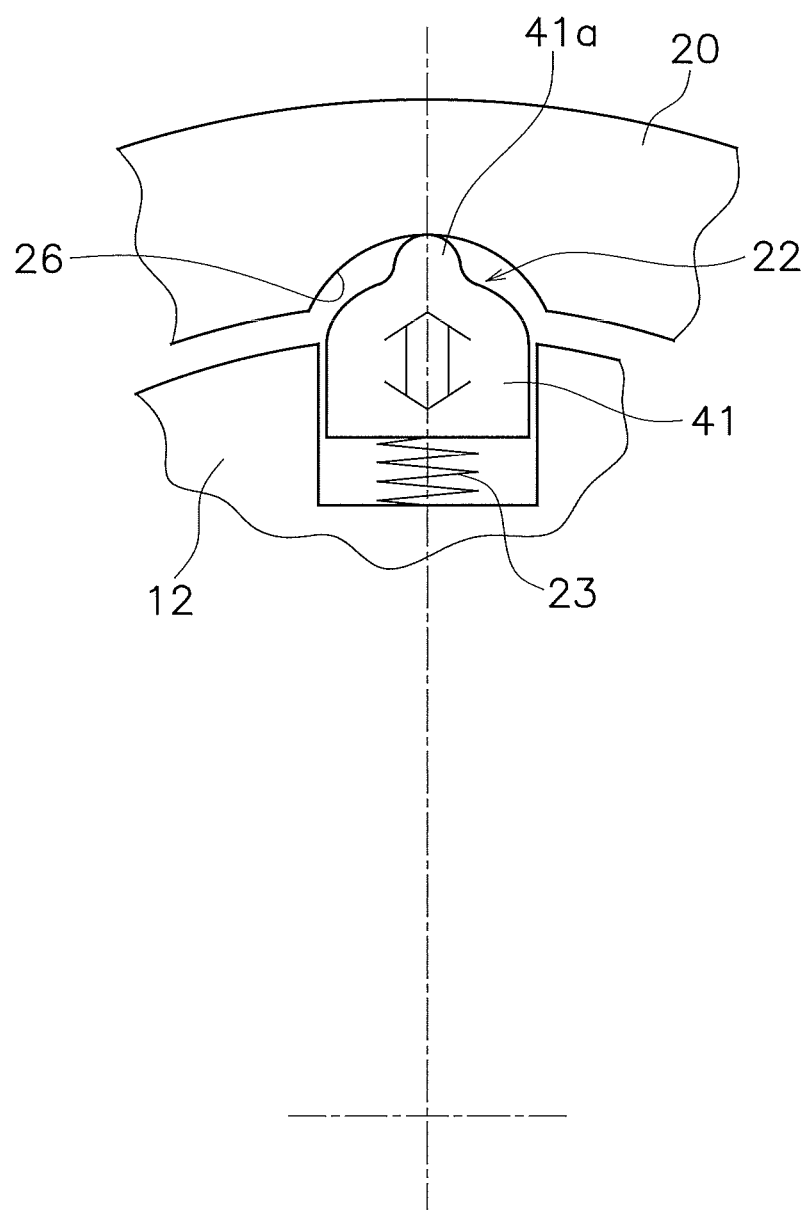
FIG. 8 is a diagram of a cam mechanism according to modification 3 and corresponds to FIG. 3.

FIG. 8 shows an example that the cam follower in each cam mechanism is integrated with each centrifugal element. In other words, each centrifugal element 41 is provided with a protrusion 41a on the outer peripheral surface thereof. The protrusion 41a protrudes radially outward in a semicircular shape. The protrusion 41a functions as a cam follower and makes contact with each cam 26 provided on the inertia ring 20, whereby a similar actuation to the aforementioned exemplary embodiment is made.

Modification 4

Figure 9:
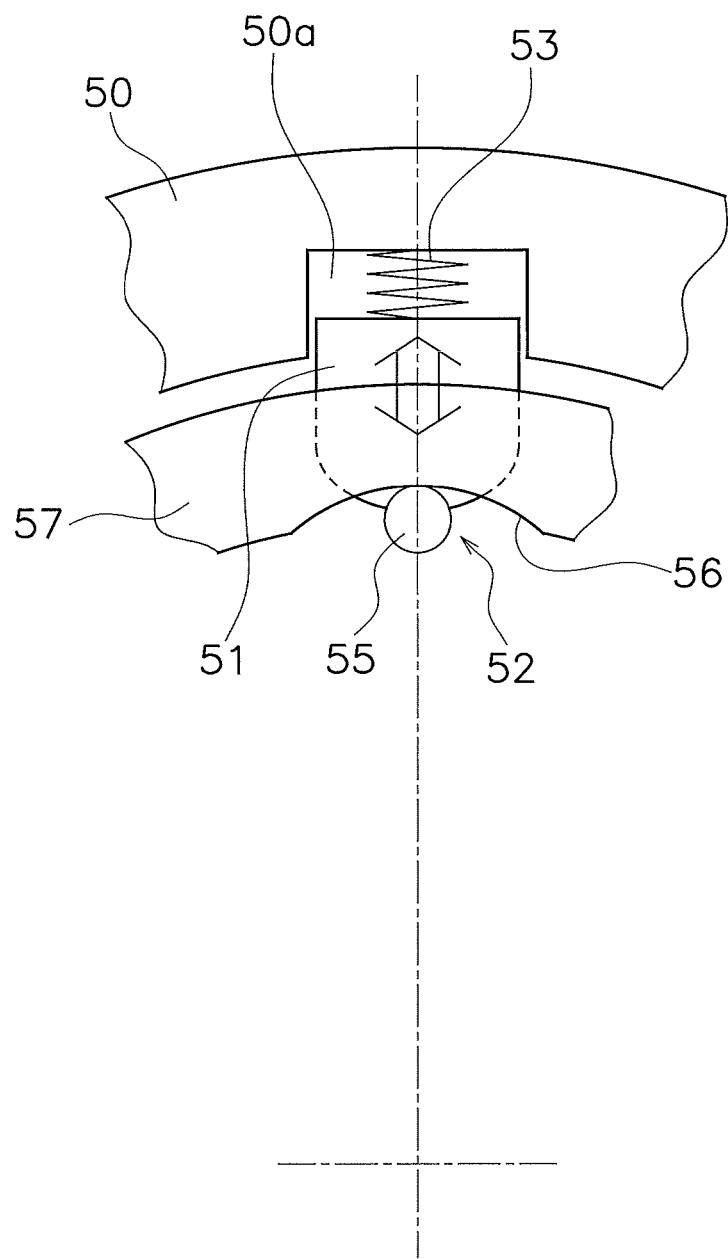
FIG. 9 is a diagram of a cam mechanism according to modification 4 and corresponds to FIG. 3.

FIG. 9 is an example that centrifugal elements are disposed on the inertia ring side whereas the cam mechanisms are disposed on the inner peripheral surface of the output-side rotor. An inertia ring 50 is provided with recesses 50a, each having a rectangular shape, on the inner peripheral surface thereof, and centrifugal elements 51 are disposed in the recesses 50a, respectively, so as to be movable in the radial direction. Additionally, a tension spring 53, pulling each centrifugal element 51 radially outward, is provided between each centrifugal element 51 and the bottom surface of each recess 50a.

On the other hand, each cam mechanism 52 is composed of a roller 55 and a cam 56. The roller 55 is provided as a cam follower on the tip (inner peripheral end) of each centrifugal element 51, whereas the cam 56 is provided on the inner peripheral surface of an output-side rotor 57. The shape of the cam 56 is similar to that of the cam in the aforementioned exemplary embodiment. The roller 55 is constantly contacted to the cam 56 by the urging force of the tension spring 53.

In this exemplary embodiment, when the inertia ring 50 is rotated together with the output-side rotor 57, a centrifugal force directed radially outward is generated in each centrifugal element 51. The roller 55 is pressed onto the cam 56 by the centrifugal force. Additionally in occurrence of torque fluctuations, a similar action to the aforementioned exemplary embodiment is made.

Other Exemplary Embodiments

The present invention is not limited to the exemplary embodiment described above, and a variety of changes or modifications can be made without departing from the scope of the present invention.

Figure 10:
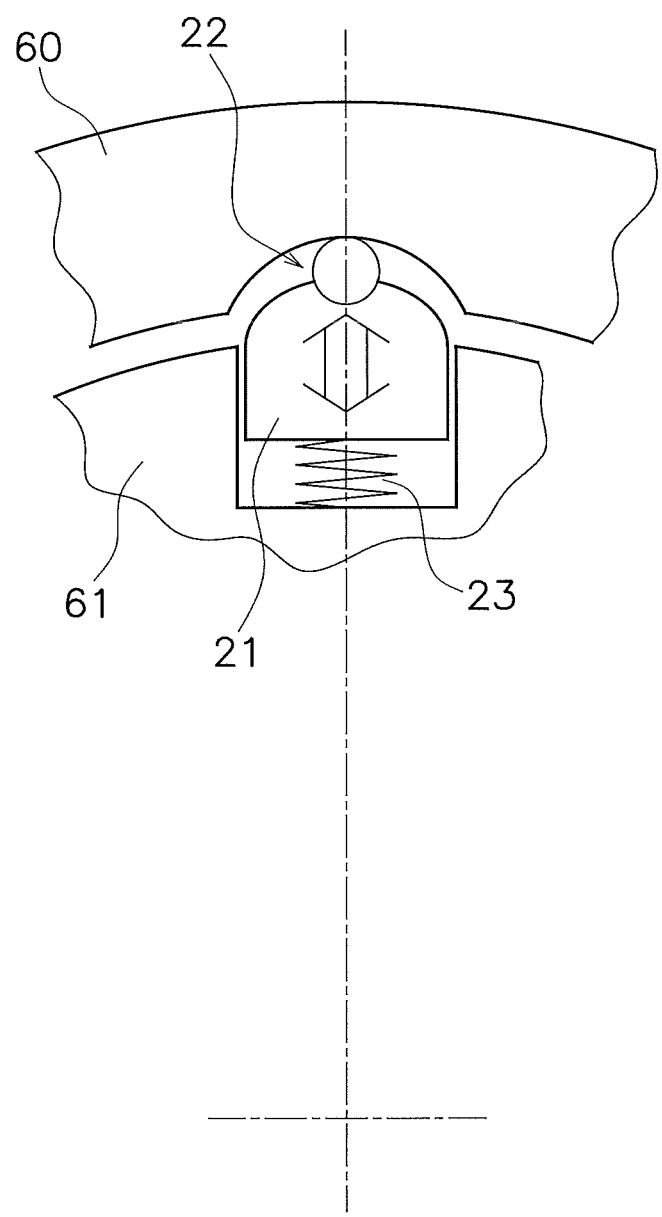
FIG. 10 is a diagram showing another exemplary embodiment of the present invention and corresponds to FIG. 3.

(a) The positional relation between the output-side rotor and the inertia ring is not limited to that in the aforementioned exemplary embodiment. For example, as shown in FIG. 10, contrarily to the positional relation in the aforementioned exemplary embodiment, an output-side rotor 60 may be disposed radially outside, whereas an inertia ring 61 may be disposed radially inside. The other constituent elements including the cam mechanisms 22 and so forth are similar to those in the aforementioned exemplary embodiment.

Figure 11:
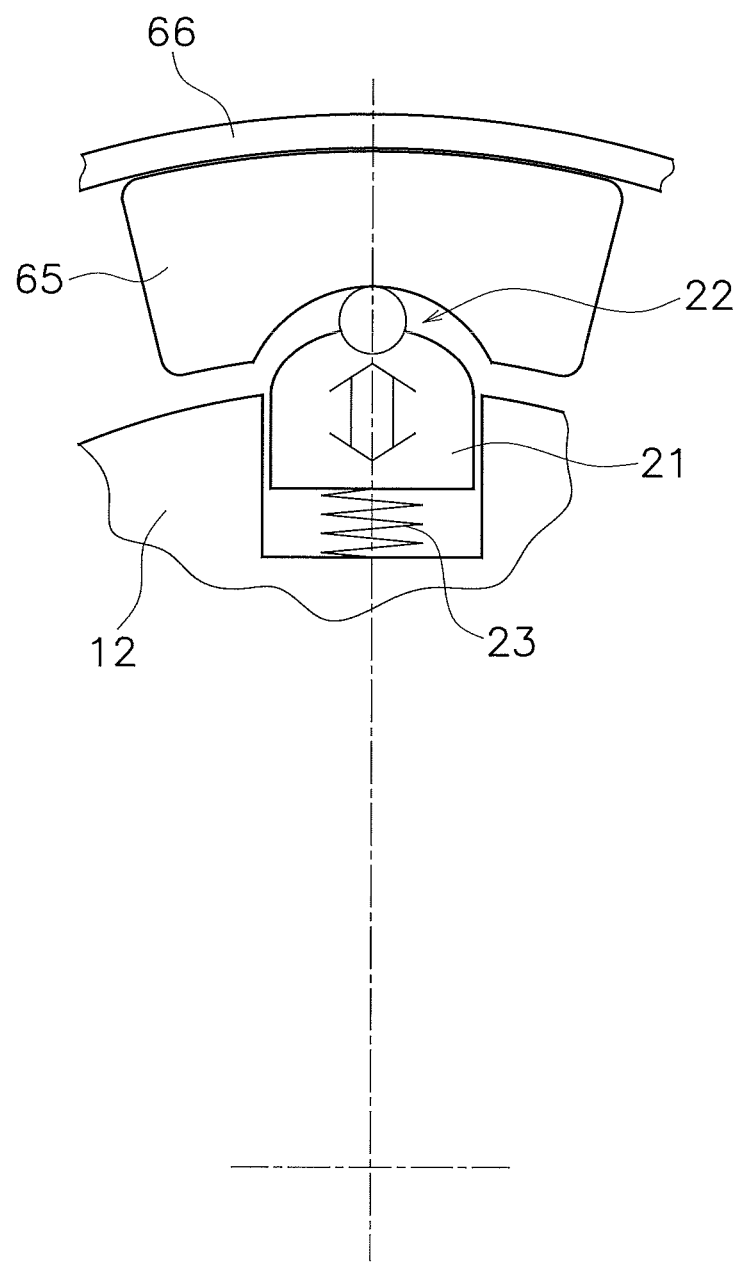
FIG. 11 is a diagram showing yet another exemplary embodiment of the present invention and corresponds to FIG. 3.

(b) In the aforementioned exemplary embodiment, the inertia ring is composed of a continuous annular member. However, as shown in FIG. 11, a plurality of inertia bodies 65 divided from each other may be disposed in circumferential alignment. In this case, for the purpose of holding the plural inertia bodies 65, a holding member such as a holding ring 66 having an annular shape is required to be provided radially outside the inertia bodies 65.

Figure 12:
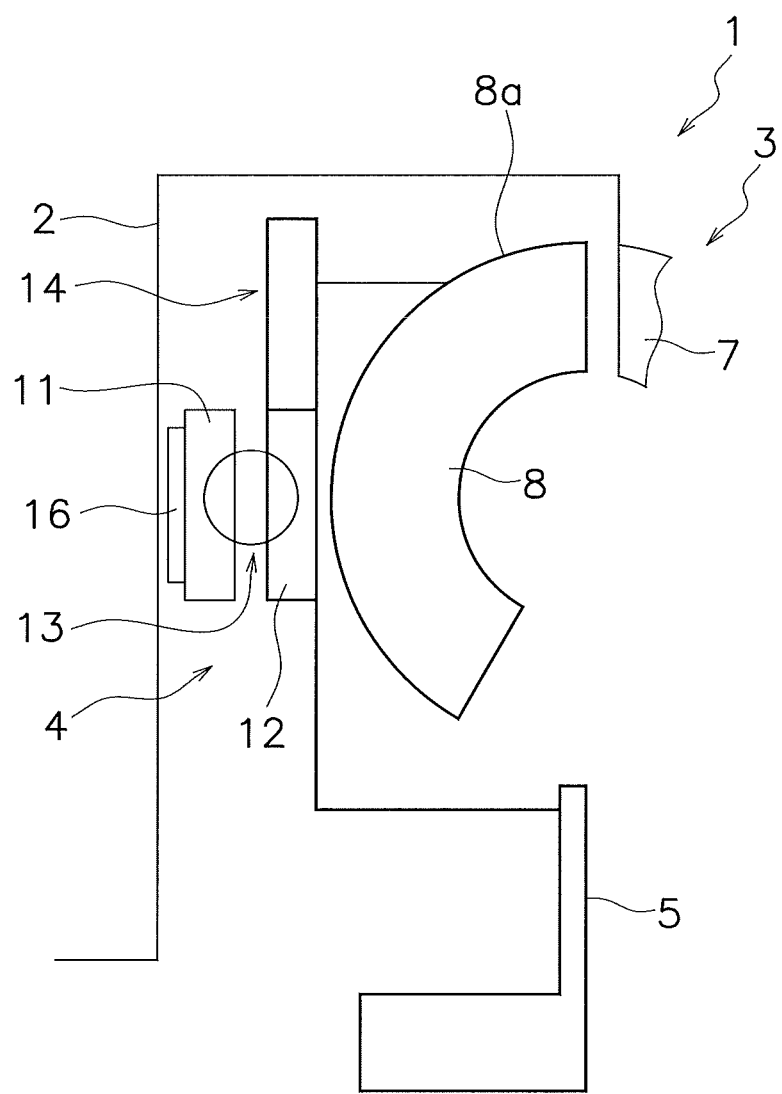
FIG. 12 is a diagram showing further yet another exemplary embodiment of the present invention and corresponds to FIG. 1.

(c) As shown in FIG. 12, an inertia ring, composing the torque fluctuation inhibiting device 14, may be configured to be coupled to the turbine 8. In this case, the turbine 8 is not coupled to the output hub 5. The inertia ring is herein coupled to the turbine 8 (exactly speaking, a turbine shell 8a), and hence, the turbine shell 8a also functions as an inertia element (an inertia body) together with the inertia ring.

It should be noted that in an exemplary embodiment shown in FIG. 12, when the lock-up off state is made, a torque from the torque converter body 3 is transmitted from the torque fluctuation inhibiting device 14 to the output-side rotor 12 through the turbine 8, and is then outputted to the output hub 5. At this time, it is difficult to transmit a torque (not fluctuating torque but steady average torque) from the inertia ring to the output-side rotor 12 through the cam mechanisms. Therefore, it is required to reliably produce an angular range in which each of the cam mechanisms is actuated, and besides, it is required to produce a configuration to transmit a torque with springs, mechanical stoppers or so forth.

Figure 13:
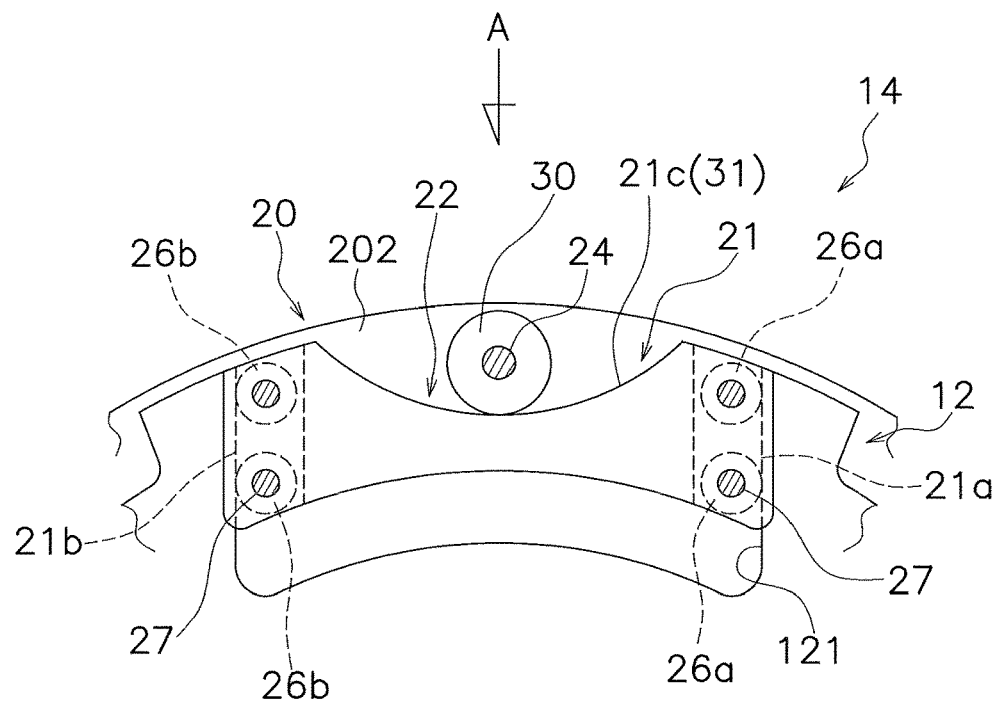
FIG. 13 is a diagram showing still further yet another exemplary embodiment of the present invention and corresponds to FIG. 3.
Figure 14:
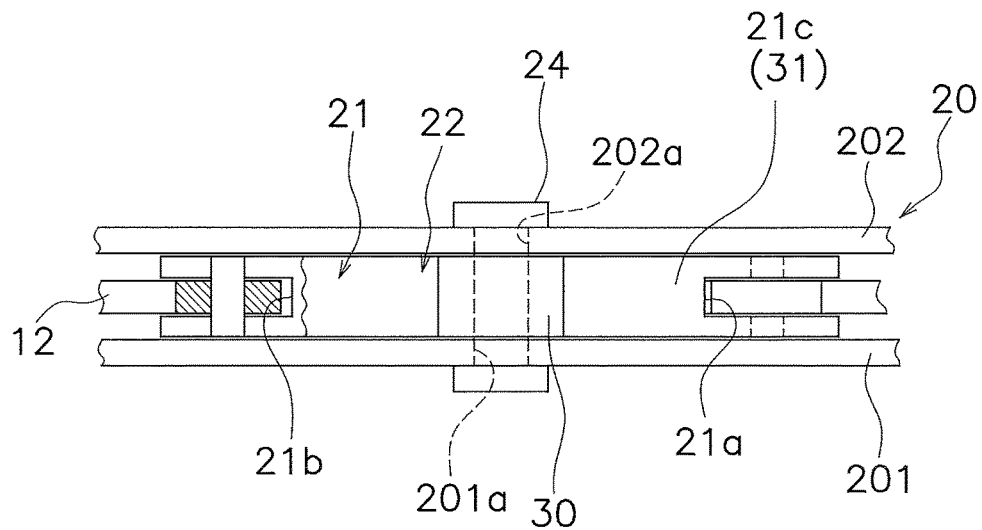
FIG. 14 is a view of FIG. 13 as seen from arrow A.

(d) As shown in FIGS. 13 and 14, the inertia ring 20 may be disposed in axial alignment with the output-side rotor 12. When explained in detail, the inertia ring 20 includes a first inertia ring 201 and a second inertia ring 202. The first and second inertia rings 201 and 202 are disposed to axially interpose the output-side rotor 12 therebetween.

Each of the first and second inertia rings 201 and 202 includes holes 201a, 202a, each of which axially penetrates therethrough. Additionally, the first and second inertia rings 201 and 202 are fixed by rivets 24 that penetrate the holes 201a and 202a thereof. Therefore, the first inertia ring 201 is axially, radially and rotation-directionally immovable with respect to the second inertia ring 202.

The output-side rotor 12 includes a plurality of recesses 121. Each recess 121 is shaped to be opened radially outward, and has a predetermined depth. Each recess 121 is provided on the outer peripheral surface of the output-side rotor 12 so as to be recessed radially inward.

Centrifugal elements 21 are disposed in the recesses 121 of the output-side rotor 12, respectively, and are radially movable by centrifugal forces to be generated by rotation of the output-side rotor 12. Each centrifugal element 21 includes grooves 21a and 21b on the both circumferential ends thereof. The width of each groove 21a, 21b is greater than the thickness of the output-side rotor 12, and the output-side rotor 12 is inserted into part of each groove 21a, 21b.

It should be noted that an outer peripheral surface 21c of each centrifugal element 21 dents in a circular-arc shape to the inner peripheral side, and as described below, functions as the cam 31.

Two rollers 26a, 26b are disposed in each of the grooves 21a and 21b provided on the both ends of each centrifugal element 21. The rollers 26a and 26b are rotatably attached about pins 27, respectively. The pins 27 are provided to penetrate the grooves 21a and 21b in the rotational axis direction. Additionally, the respective rollers 26a and 26b are capable of rolling along and in contact with the lateral surfaces of each recess 121.

Each cam mechanism 22 is composed of a roller 30 and a cam 31. The roller 30 is provided as a cam follower and has a cylindrical shape. The cam 31 corresponds to the outer peripheral surface 21c of each centrifugal element 21. The roller 30 is fitted to the outer periphery of the trunk of each rivet 24. In other words, the roller 30 is supported by each rivet 24. It should be noted that the roller 30 is preferably attached to each rivet 24 in a rotatable manner, but alternatively, may be attached to each rivet 24 in a non-rotatable manner. The cam 31 is a circular-arc surface with which the roller 30 makes contact. The roller 30 is moved along the cam 31 when the output-side rotor 12 and the first and second inertia rings 201 and 201 are rotated relative to each other in a predetermined angular range.

When rotational phase difference between the output-side rotor 12 and the first and second inertia rings 201 and 202 is produced by the contact between the roller 30 and the cam 31, a centrifugal force generated in each centrifugal element 21 is converted into a circumferential force by which the rotational phase difference is reduced. It should be noted that the roller 30 may be a bearing.

Application Examples

The torque fluctuation inhibiting device described above can be disposed in a variety of settings when applied to a torque converter or other types of power transmission device. Specific application examples will be hereinafter explained with use of schematic diagrams of the torque converter and the other types of power transmission device.

Figure 15:
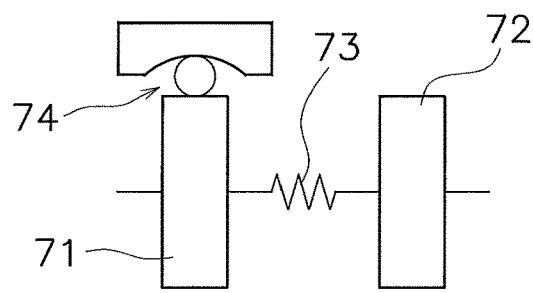
FIG. 15 is a schematic diagram showing application example 1 of the present invention.

(1) FIG. 15 is a diagram schematically showing a torque converter. The torque converter includes an input-side rotor 71, an output-side rotor 72 and a damper 73 disposed between the both rotors 71 and 72. The input-side rotor 71 includes members such as a front cover, a drive plate and a piston. The output-side rotor 72 includes a driven plate and a turbine hub. The damper 73 includes a plurality of torsion springs.

In the example shown in FIG. 15, a centrifugal element is provided on any of the members composing the input-side rotor 71, and a cam mechanism 74 is provided to be actuated with use of a centrifugal force acting on the centrifugal element. A configuration applicable to the cam mechanism 74 is similar to that in the aforementioned respective exemplary embodiments.

Figure 16:
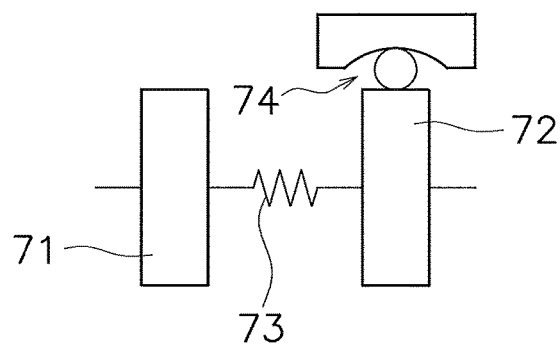
FIG. 16 is a schematic diagram showing application example 2 of the present invention.

(2) In a torque converter shown in FIG. 16, a centrifugal element is provided on any of the members composing the output-side rotor 72, and the cam mechanism 74 is provided to be actuated with use of a centrifugal force acting on the centrifugal element. A configuration applicable to the cam mechanism 74 is similar to that in the aforementioned respective exemplary embodiments.

Figure 17:
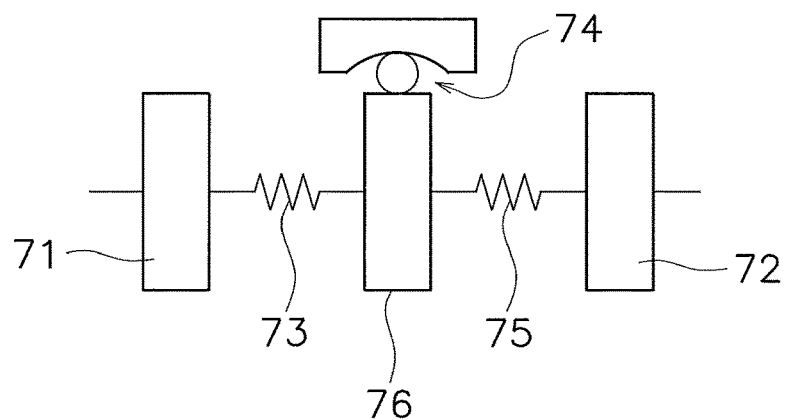
FIG. 17 is a schematic diagram showing application example 3 of the present invention.

(3) A torque converter shown in FIG. 17 includes another damper 75 and an intermediate member 76 provided between the two dampers 73 and 75 in addition to the configurations shown in FIGS. 15 and 16. The intermediate member 76 is rotatable relative to the input-side rotor 71 and the output-side rotor 72, and makes the two dampers 73 and 75 act in series.

In the example shown in FIG. 17, a centrifugal element is provided on the intermediate member 76, and the cam mechanism 74 is provided to be actuated with use of a centrifugal force acting on the centrifugal element. A configuration applicable to the cam mechanism 74 is similar to that in the aforementioned respective exemplary embodiments.

Figure 18:
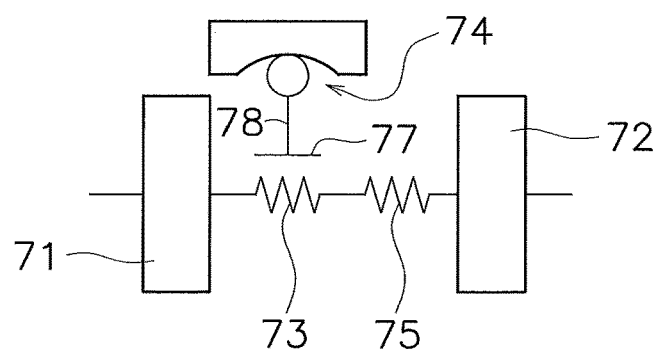
FIG. 18 is a schematic diagram showing application example 4 of the present invention.

(4) A torque converter shown in FIG. 18 includes a float member 77. The float member 77 is a member for supporting the torsion springs composing the damper 73. For example, the float member 77 has an annular shape and is disposed to cover the torsion springs from the outer peripheral side and at least one lateral side. Additionally, the float member 77 is rotatable relative to the input-side rotor 71 and the output-side rotor 72, and is rotated together with the damper 73 by friction with the torsion springs of the damper 73. In other words, the float member 77 is also rotated.

In the example shown in FIG. 18, a centrifugal element 78 is provided on the float member 77, and the cam mechanism 74 is provided to be actuated with use of a centrifugal force acting on the centrifugal element 78. A configuration applicable to the cam mechanism 74 is similar to that in the aforementioned respective exemplary embodiments.

Figure 19:
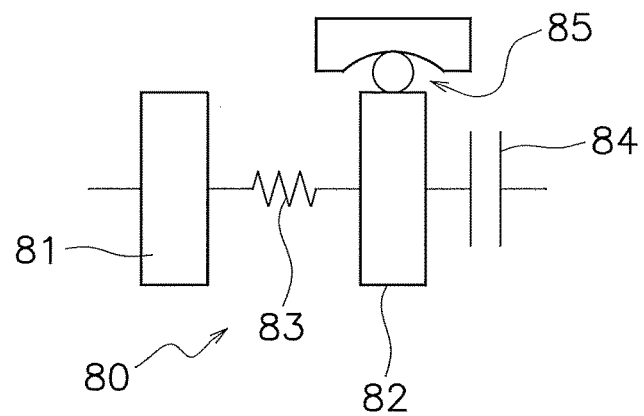
FIG. 19 is a schematic diagram showing application example 5 of the present invention.

(5) FIG. 19 is a schematic diagram of a power transmission device that includes a flywheel 80, composed of two inertia bodies 81 and 82, and a clutch device 84. In other words, the flywheel 80, disposed between the engine and the clutch device 84, includes the first inertia body 81, the second inertia body 82 and a damper 83. The second inertia body 82 is disposed to be rotatable relative to the first inertia body 81. The damper 83 is disposed between the two inertia bodies 81 and 82. It should be noted that the second inertia body 82 is composed of rotary members including a clutch cover composing part of the clutch device 84.

In the example shown in FIG. 19, a centrifugal element is provided on any of the rotary members composing the second inertia body 82, and a cam mechanism 85 is provided to be actuated with use of a centrifugal force acting on the centrifugal element. A configuration applicable to the cam mechanism 85 is similar to that in the aforementioned respective exemplary embodiments.

Figure 20:
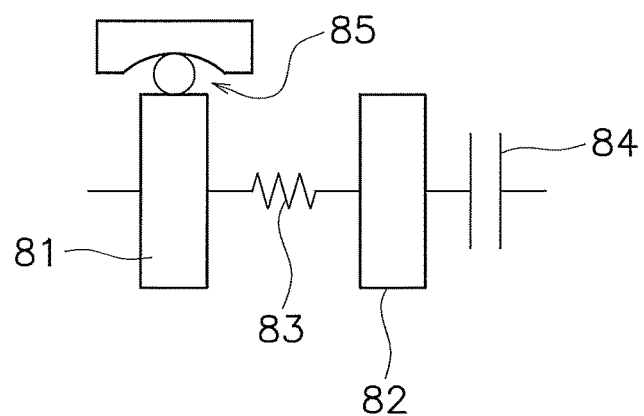
FIG. 20 is a schematic diagram showing application example 6 of the present invention.

(6) FIG. 20 shows an example of a power transmission device similar to that in FIG. 19. In this example, a centrifugal element is provided on the first inertia body 81. Additionally, the cam mechanism 85 is provided to be actuated with use of a centrifugal force acting on the centrifugal element. A configuration applicable to the cam mechanism 85 is similar to that in the aforementioned respective exemplary embodiments.

Figure 21:
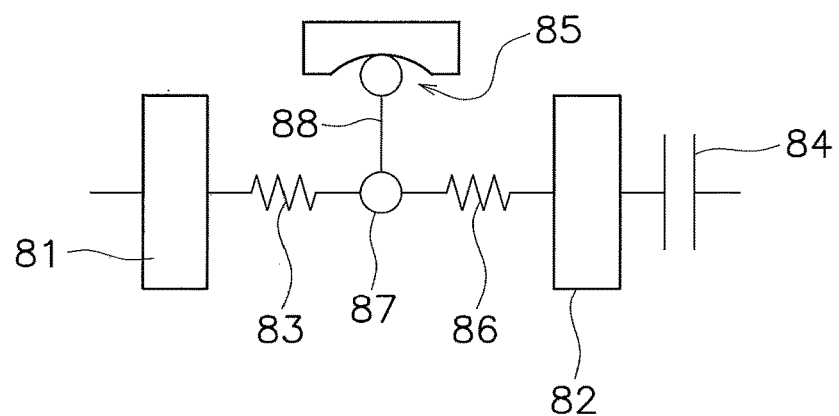
FIG. 21 is a schematic diagram showing application example 7 of the present invention.

(7) A power transmission device shown in FIG. 21 includes another damper 86 and an intermediate member 87 provided between the two dampers 83 and 86 in addition to the configurations shown in FIGS. 19 and 20. The intermediate member 87 is rotatable relative to the first and second inertia bodies 81 and 82.

In the example shown in FIG. 21, a centrifugal element 88 is provided on the intermediate member 87, and the cam mechanism 85 is provided to be actuated with use of a centrifugal force acting on the centrifugal element 88. A configuration applicable to the cam mechanism 85 is similar to that in the aforementioned respective exemplary embodiments.

Figure 22:
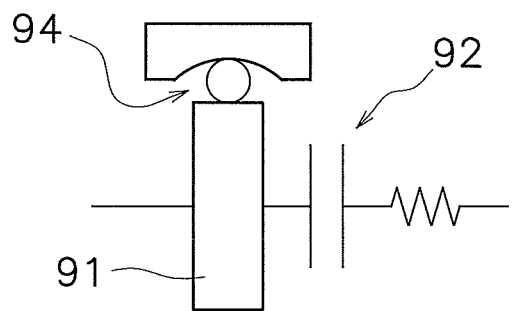
FIG. 22 is a schematic diagram showing application example 8 of the present invention.

(8) FIG. 22 is a schematic diagram of a power transmission device that a clutch device is provided on one flywheel. In FIG. 22, a first inertia body 91 includes one flywheel and a clutch cover of a clutch device 92. In this example, a centrifugal element is provided on any of the rotary members composing the first inertia body 91, and a cam mechanism 94 is provided to be actuated with use of a centrifugal force acting on the centrifugal element. A configuration applicable to the cam mechanism 94 is similar to that in the aforementioned respective exemplary embodiments.

Figure 23:
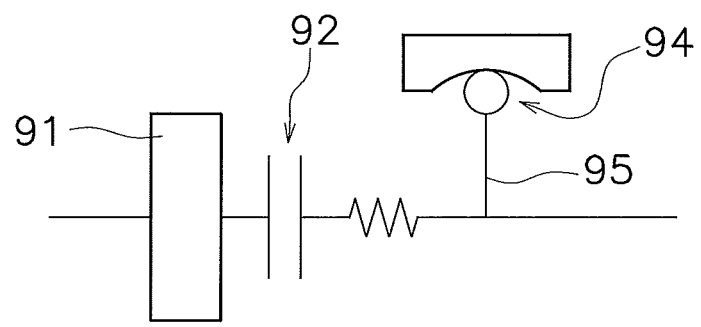
FIG. 23 is a schematic diagram showing application example 9 of the present invention.

(9) FIG. 23 shows an example of a power transmission device similar to that in FIG. 22. In this example, a centrifugal element is provided on an output side of the clutch device 92. Additionally, the cam mechanism 94 is provided to be actuated with use of a centrifugal force acting on the centrifugal element 95. A configuration applicable to the cam mechanism 94 is similar to that in the aforementioned respective exemplary embodiments.

(10) The torque fluctuation inhibiting device of the present invention may be disposed on any of the rotary members composing the transmission, and furthermore, may be disposed on an output-side shaft (a propeller shaft or a drive shaft) of the transmission, although these configurations are not shown in the drawings.

(11) As another application example, the torque fluctuation inhibiting device of the present invention may be further applied to a heretofore well-known dynamic damper device or a power transmission device provided with a pendulum-type damper device.

REFERENCE SIGNS LIST

1 Torque converter
12 Output-side rotor
14 Torque fluctuation inhibiting device
20, 40, 61 Inertia ring (mass body)
21, 31, 78, 88, 95 Centrifugal element
22, 32, 74, 85, 94 Cam mechanism
23 Coil spring (urging member)
25 Roller
26, 31a Cam
30 Thrust member
65 Inertia body
66 Holding ring
71 Input-side rotor
72 Output-side rotor
73, 75, 83, 86 Damper
76, 87 Intermediate member
77 Float member
80 Flywheel
81, 91 First inertia body
82 Second inertia body
84, 92 Clutch device

The invention claimed is:

1. A torque fluctuation inhibiting device inhibiting torque fluctuations in a rotor to which a torque is inputted from a drive source, the torque fluctuation inhibiting device comprising:
a mass body disposed to be rotatable with the rotor and be rotatable relative to the rotor;
a centrifugal element disposed to receive a centrifugal force to be generated by rotation of at least one of the rotor and the mass body; and
a plurality of conversion mechanisms each configured to convert the centrifugal force into a circumferential force when a relative displacement is produced between the rotor and the mass body in a rotational direction, the circumferential force directed to reduce the relative displacement, wherein
the respective plurality of conversion mechanisms are disposed at intervals in a circumferential direction, and
the mass body is restricted from moving in a radial direction by shifting a state in which the mass body does not contact the rotor in the radial direction to a state in which the mass body contacts the rotor in the radial direction.

2. The torque fluctuation inhibiting device according to claim 1, wherein
the plurality of conversion mechanisms are three or more conversion mechanisms, and
the plurality of conversion mechanisms are disposed at intervals in the circumferential direction.

3. The torque fluctuation inhibiting device according to claim 1, wherein the plurality of conversion mechanisms are cam mechanisms.

4. The torque fluctuation inhibiting device according to claim 1, wherein a ratio of an amount of increase in the circumferential force to an amount of the relative displacement between the rotor and the mass body is determined to make a normal mode vibration frequency of the torque fluctuation inhibiting device equal to an excitation vibration frequency of the drive source.

5. The torque fluctuation inhibiting device according to claim 1, wherein a ratio of an amount of increase in the circumferential force to an amount of the relative displacement between the rotor and the mass body is determined to make a normal mode vibration frequency of the torque fluctuation inhibiting device higher than an excitation vibration frequency of the drive source.

6. The torque fluctuation inhibiting device according to claim 1, wherein a ratio of an amount of increase in the circumferential force to an amount of the relative displacement between the rotor and the mass body is determined to make a normal mode vibration frequency of the torque fluctuation inhibiting device lower than an excitation vibration frequency of the drive source.

7. The torque fluctuation inhibiting device according to claim 1, wherein a ratio of a moment of inertia of the mass body to a moment of inertia of the rotor is greater than or equal to 0.033.

8. A torque converter disposed between the drive source and a transmission, the torque converter comprising:
the rotor including an input-side rotor to which the torque is inputted from the drive source and an output-side rotor configured to output the torque to the transmission;
a damper disposed between the input-side rotor and the output-side rotor; and
the torque fluctuation inhibiting device recited in claim 1.

9. The torque converter according to claim 8, wherein the torque fluctuation inhibiting device is attached to the input-side rotor.

10. The torque converter according to claim 8, wherein the torque fluctuation inhibiting device is attached to the output-side rotor.

11. The torque converter according to claim 8, wherein the damper includes
a first damper to which the torque is inputted from the input-side rotor,
a second damper outputting the torque to the output-side rotor, and
an intermediate member provided between the first damper and the second damper, and
the torque fluctuation inhibiting device is attached to the intermediate member.

12. The torque converter according to claim 8, further comprising:

a float member, wherein the damper includes a plurality of coil springs, the float member is rotatable relative to the input-side rotor and the output-side rotor, the float member supporting the plurality of coil springs, and the torque fluctuation inhibiting device is attached to the float member.

13. A power transmission device comprising:

a flywheel including the mass body and a damper, the mass body including a first inertia body and a second inertia body rotated about a rotational axis, the second inertia body rotatable relative to the first inertia body, the damper disposed between the first inertia body and the second inertia body;

a clutch device provided on the second inertia body; and the torque fluctuation inhibiting device recited in claim 1.

14. The power transmission device according to claim 13, wherein the torque fluctuation inhibiting device is attached to the second inertia body.

15. The power transmission device according to claim 13, wherein the torque fluctuation inhibiting device is attached to the first inertia body.

16. The power transmission device according to claim 13, wherein the damper includes a first damper to which the torque is inputted from the first inertia body, a second damper outputting the torque to the second inertia body, and an intermediate member provided between the first damper and the second damper, and the torque fluctuation inhibiting device is attached to the intermediate member.

17. A torque fluctuation inhibiting device inhibiting torque fluctuations in a rotor to which a torque is inputted from a drive source, the torque fluctuation inhibiting device comprising:

a mass body disposed to be rotatable with the rotor and be rotatable relative to the rotor;

a centrifugal element disposed to receive a centrifugal force to be generated by rotation of at least one of the rotor and the mass body; and a conversion mechanism configured to convert the centrifugal force into a circumferential force when a relative displacement is produced between the rotor and the mass body in a rotational direction, the circumferential force directed to reduce the relative displacement, wherein the mass body is restricted from moving in a radial direction by shifting a state in which the mass body does not contact the rotor in the radial direction to a state in which the mass body contacts the rotor in the radial direction.

18. A torque fluctuation inhibiting device inhibiting torque fluctuations in a rotor to which a torque is inputted from a drive source, the torque fluctuation inhibiting device comprising:

a mass body disposed to be rotatable with the rotor and be rotatable relative to the rotor; and a conversion mechanism configured to apply a circumferential force to the rotor when a relative displacement is produced between the rotor and the mass body in a rotational direction, the circumferential force directed to reduce the relative displacement, wherein a ratio of an amount of increase in the circumferential force to an amount of the relative displacement between the rotor and the mass body increases with increase in a rotational speed of the rotor, and the mass body is restricted from moving in a radial direction by shifting a state in which the mass body does not contact the rotor in the radial direction to a state in which the mass body contacts the rotor in the radial direction.

* * * * *